(12) United States Patent
Surti et al.

(10) Patent No.: US 9,928,564 B2
(45) Date of Patent: Mar. 27, 2018

(54) EFFICIENT HARDWARE MECHANISM TO ENSURE SHARED RESOURCE DATA COHERENCY ACROSS DRAW CALLS

(71) Applicant: Intel Corporation, Santa Clara, CA (US)

(72) Inventors: Prasoonkumar Surti, Folsom, CA (US); Aditya Navale, Folsom, CA (US); Jeffery S. Boles, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 14/315,597

(22) Filed: Jun. 26, 2014

(65) Prior Publication Data

US 2015/0379661 A1 Dec. 31, 2015

(51) Int. Cl.
| | | |
|---|---|---|
| G06T 1/20 | (2006.01) | |
| G06T 1/60 | (2006.01) | |
| G09G 5/10 | (2006.01) | |
| G06T 15/80 | (2011.01) | |
| G06T 15/00 | (2011.01) | |
| G09G 5/36 | (2006.01) | |

(52) U.S. Cl.
CPC .............. *G06T 1/20* (2013.01); *G06T 15/005* (2013.01); *G09G 5/363* (2013.01); *G09G 2360/08* (2013.01)

(58) Field of Classification Search
CPC ........ G06T 1/20; G06T 15/80; G06F 11/3423
USPC .......................................... 717/124
See application file for complete search history.

(56) References Cited

U.S. PATENT DOCUMENTS

| | | | | |
|---|---|---|---|---|
| 7,522,170 | B2* | 4/2009 | Parikh ..................... | G06T 17/00 345/427 |
| 7,728,841 | B1* | 6/2010 | Nordquist ............. | G06T 15/005 345/502 |
| 7,877,565 | B1* | 1/2011 | Allen ...................... | G06F 9/383 345/537 |
| 9,024,957 | B1* | 5/2015 | Mahan ...................... | G06F 8/61 345/538 |
| 2008/0033696 | A1 | 2/2008 | Aguaviva et al. | |
| 2011/0063313 | A1* | 3/2011 | Bolz ..................... | G06T 15/005 345/531 |
| 2011/0242125 | A1 | 10/2011 | Hall et al. | |

(Continued)

OTHER PUBLICATIONS

International Search Report for PCT Application No. PCT/US2015/034263, dated Aug. 26, 2015, 3 pages.

(Continued)

*Primary Examiner* — Wei Zhen
*Assistant Examiner* — Brahim Bourzik
(74) *Attorney, Agent, or Firm* — Jordan IP Law, LLC

(57) ABSTRACT

Systems and methods may provide for receiving a plurality of signals from a software module associated with a shared resource such as, for example, an unordered access view (UAV). The plurality of signals may include a first signal that indicates whether a draw call accesses the shared resource, a second signal that indicates whether a boundary of the draw call has been reached, and a third signal that indicates whether the draw call has a coherency requirement. Additionally, a workload corresponding to the draw call may be selectively dispatched in a shader invocation based on the plurality of signals.

24 Claims, 5 Drawing Sheets

(56) References Cited

U.S. PATENT DOCUMENTS

| | | | |
|---|---|---|---|
| 2012/0331470 A1* | 12/2012 | Jones | G06F 9/544 |
| | | | 718/102 |
| 2013/0293546 A1 | 11/2013 | Lee et al. | |
| 2014/0078156 A1 | 3/2014 | Carroll et al. | |
| 2014/0146062 A1* | 5/2014 | Kiel | G06F 11/3636 |
| | | | 345/522 |
| 2014/0168242 A1 | 6/2014 | Kubisch et al. | |
| 2014/0184606 A1* | 7/2014 | de Richebourg | G06T 1/60 |
| | | | 345/440 |
| 2014/0354644 A1* | 12/2014 | Nystad | G06T 1/20 |
| | | | 345/426 |

OTHER PUBLICATIONS

Written Opinion for PCT Application No. PCT/US2015/034263 dated Aug. 26, 2015, 5 pages.
NuVera, "What Is a Draw Call? How Does It Effect My Product?", Article ID: 21, Mar. 4, 2013, 1 page.

* cited by examiner

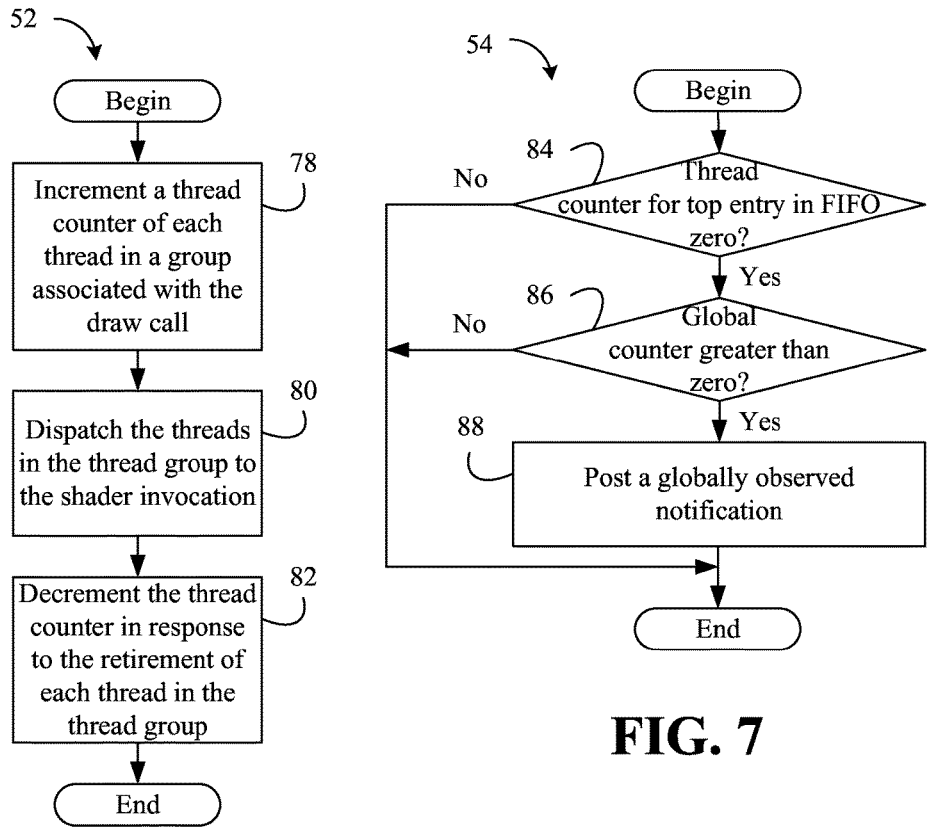
FIG. 6
FIG. 7
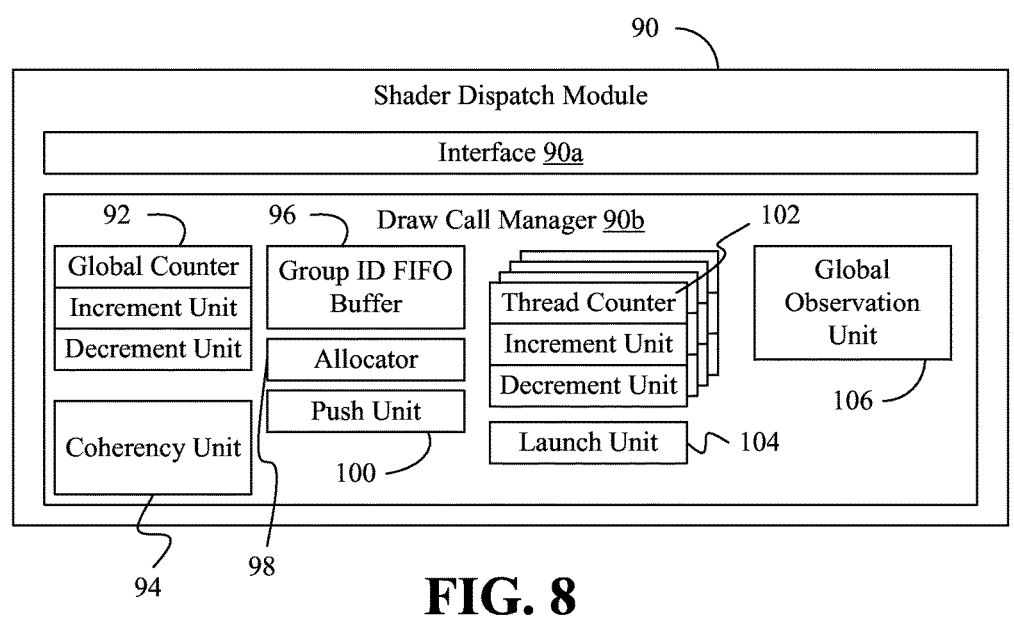
FIG. 8

EFFICIENT HARDWARE MECHANISM TO ENSURE SHARED RESOURCE DATA COHERENCY ACROSS DRAW CALLS

BACKGROUND

Graphics pipelines may facilitate the visual output of content on computing systems. In one example, the graphics pipeline is represented as a series of stages including various "shader" stages (e.g., vortex, hull, domain, geometry and/or pixel shader stages) that establish the position, hue, saturation, brightness, and contrast of the pixels, vertices, and/or textures used to construct a final image. An unordered access view (UAV) may be used by the shader stages to buffer/store intermediate surface information prior to the transfer of final images to a render target that is output via a display/screen.

During operation, a given shader stage might write to and/or read from the UAV via one or more draw calls. Because the UAV may be shared among multiple shader stages, concerns over read-after-write (RAW) hazards associated with "consumer" draw calls from one shader stage accessing information in the UAV prior to completion of "producer" draw calls from another shader stage. To protect against such hazards, conventional solutions may use a software module running on a central processing unit (CPU) at the application programming interface (API) level to flush out the entire graphics pipeline when a draw call dependency is detected. Such an approach may insert relatively large "bubbles" into the pipeline and in turn have a negative impact on efficiency, performance, power consumption and/or battery life.

BRIEF DESCRIPTION OF THE DRAWINGS

The various advantages of the embodiments will become apparent to one skilled in the art by reading the following specification and appended claims, and by referencing the following drawings, in which:

FIG. 6 is a flowchart of an example of a method of maintaining a thread counter according to an embodiment;

FIG. 7 is a flowchart of an example of a method of globally observing draw calls according to an embodiment;

FIG. 8 is a block diagram of an example of a shader dispatch module according to an embodiment;

DETAILED DESCRIPTION

Figure 1:
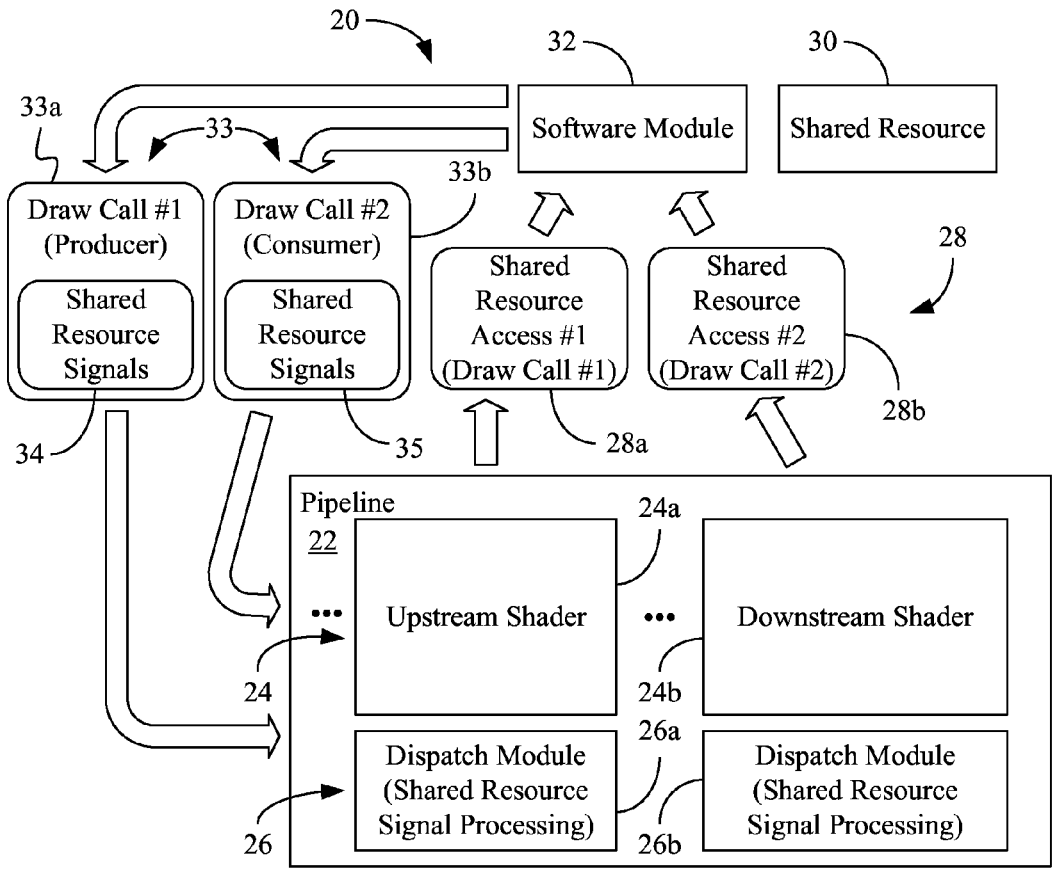
FIG. 1 is a block diagram of an example of a graphics pipeline architecture according to an embodiment.

FIG. 1 shows an architecture 20 in which a software module 32 such as, for example, an application programming interface (API), operating system (OS) component, user mode driver (UMD), etc., issues draw calls 33 (33a, 33b) to a graphics pipeline 22 having a series of stages. In the illustrated example, the stages include a plurality of shader invocations 24 (24a, 24b, e.g., in a graphics processor, compute engine/slice, execution unit, or other graphics hardware) that may generally establish the position, hue, saturation, brightness, and contrast of the pixels, vertices, and/or textures used to construct final images. The plurality of shader invocations 24 may include, for example, an upstream shader 24a and a downstream shader 24b having corresponding shader dispatch modules 26 (26a, 26b, e.g., in graphics hardware) that dispatch workloads (e.g., in the form of threads and/or thread groups) to their respective shader invocations 24 according to the draw calls 33. The shader invocations 24 may issue accesses 28 (28a, 28b) to a shared resource 30 (e.g., DIRECTX unordered access view/UAV, OPENGL image, general purpose buffer, scratch memory, etc.) via the software module 32. The accesses 28 may generally buffer/store visual information (e.g., intermediate surface information, scratch memory data) in the shared resource 30 prior to the transfer of final images to a render target that is output via a display/screen (not shown).

More particularly, the illustrated upstream shader 24a issues a first access 28a ("Shared Resource Access #1") to the shared resource 30, wherein the first access 28a corresponds to a first draw call 33a ("Draw Call #1"). Similarly, the illustrated downstream shader 24b issues a second access 28b ("Shared Resource Access #2") to the shared resource 30, wherein the second access 28b corresponds to a second draw call 33b ("Draw Call #2"). The first access 28a might be issued from, for example, one or more threads involving vortex, hull, domain and/or geometry shader operations relative to a particular region of an image (e.g., a 4×4 block of pixels operated on by a group of sixteen threads), whereas the second access 28b might be issued from, for example, one or more threads involving pixel shader operations relative to the same region of the image. Thus, if the first access 28a writes data that is consumed by the second access 28b, a producer-consumer relationship may exist between the draw calls 33 and across the shader invocations 24.

In the illustrated example, rather than issuing a pipeline flush after the first draw call 33a and waiting for the flush to travel all the way through the pipeline 22 before issuing the second draw call 33b, the software module 32 issues a first plurality of signals 34 with the first draw call 33a and a second plurality of signals 35 with the second draw call 33b. As will be discussed in greater detail, the illustrated signals 34, 35 enable one or more of the dispatch modules 26 to internally track the status of the draw calls 33 at the pipeline level and determine whether a producer-consumer relationship exists. Accordingly, the dispatch module 26b corresponding to the downstream shader 24b may selectively dispatch the workload corresponding to the second draw call 28b based on the second plurality of signals 35. Of particular note is that the workload corresponding to the second draw call 33b may be permitted to progress through the earlier stages of the pipeline 22 rather than waiting for the entire pipeline 22 to be flushed. Such an approach may substantially reduce the existence of bubbles in the pipeline 22, and may in turn improve efficiency and performance, reduce power consumption and/or extend battery life.

The signals 34, 35 may be formatted as a set of command/instruction bits that communicate information regarding whether each draw call 33 accesses the shared resource 30, whether a boundary (e.g., beginning, end) of each draw call 33 has been reached, whether each draw call 33 has a coherency requirement (e.g., is a consumer relative to an earlier draw call), and so forth. Table I below shows one example of a protocol for the signals 34, 35.

TABLE I

| Shared Resource Marker | Shared Resource Boundary | Shared Resource Coherency Requirement | Meaning and Behavior |
|---|---|---|---|
| 0 | X | X | Ignore boundary and coherency bits when shared resource marked is zero |
| 1 | 1 | 0 | Beginning of draw call and this new draw call does not have a coherency requirement with respect to previous draw calls |
| 1 | 1 | 1 | Beginning of draw call and this new draw call has a coherency requirement with respect to previous draw calls |
| 1 | 0 | X | End of draw call, ignore coherency bit |

Thus, the signals 34, 35 may be examined by the dispatch module 26 of a particular shader invocation 24 such as, for example, the dispatch module 26b of the downstream shader 24b (e.g., pixel shader) as the draw calls 33 giving rise to the accesses 28 are issued by the software module 32 to the graphics pipeline 22. The dispatch module 26 may in turn use the signals 34, 35 to track the draw calls 33 and associated threads/thread groups, and determine whether to dispatch subsequent workloads to the shader invocation or withhold those workloads until, for example, one or more producer draw calls have completed.

Figure 2:
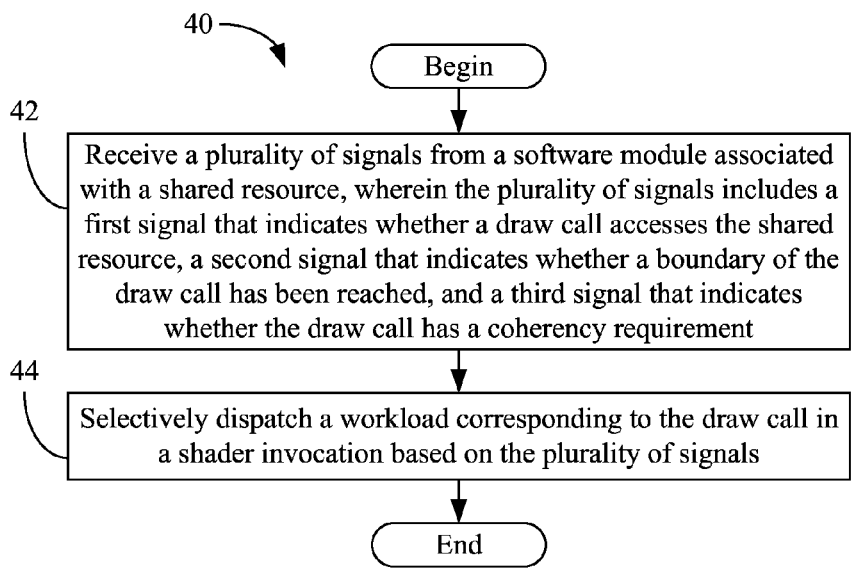
FIG. 2 is a flowchart of an example of a method of operating a shader stage dispatch module according to an embodiment.

FIG. 2 shows a method 40 of operating a shader dispatch module such as, for example, the dispatch module 26b (FIG. 1), already discussed. The method 40 may be implemented in one or more modules as a set of logic instructions stored in a machine- or computer-readable storage medium such as random access memory (RAM), read only memory (ROM), programmable ROM (PROM), flash memory, etc., as configurable logic such as, for example, programmable logic arrays (PLAs), field programmable gate arrays (FPGAs), complex programmable logic devices (CPLDs), as fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 40 may be written in any combination of one or more programming languages, including an object oriented programming language such as C++ or the like and conventional procedural programming languages, such as the "C" programming language or similar programming languages. Moreover, the method 40 may be implemented using any of the herein mentioned circuit technologies.

Illustrated processing block 42 provides for receiving a plurality of signals from a software module associated with a shared resource. The plurality of signals may include, for example, a first signal (e.g., one or more bits corresponding to the "Shared Resource Marker" column of Table I) that indicates whether a draw call accesses the shared resource, a second signal (e.g., one or more bits corresponding to the "Shared Resource Boundary" column of Table I) that indicates whether a boundary of the draw call has been reached, a third signal (e.g., one or more bits corresponding to the "Shared Resource Coherency Requirement" column of Table I) that indicates whether the draw call has a coherency requirement relative to one or more previous draw calls, and so forth. Additionally, block 44 may selectively dispatch a workload corresponding to the draw call in a shader invocation based on the plurality of signals.

Block 44 may generally involve, for example, preventing RAW hazards, maintaining a global counter, populating a first in first out (FIFO) buffer for thread group identifiers, maintaining thread counters, globally observing draw calls, and so forth. FIGS. 3-7 show methods 46, 48, 50, 52 and 54 of performing these various operations, which may also be implemented in modules as a set of logic instructions stored in a machine- or computer-readable storage medium such as RAM, ROM, PROM, flash memory, etc., as configurable logic such as, for example, PLAs, FPGAs, CPLDs, as fixed-functionality logic hardware using circuit technology such as, for example, ASIC, CMOS or TTL technology, or any combination thereof.

Figure 3:
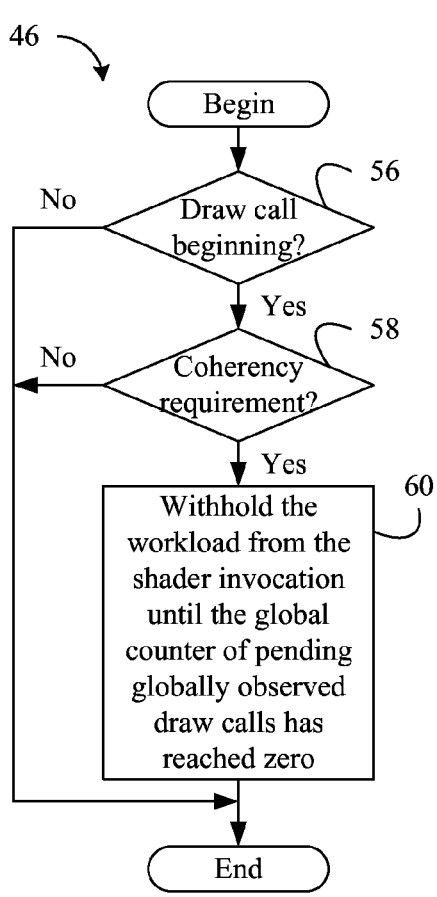
FIG. 3 is a flowchart of an example of a method of preventing read-after-write (RAW) hazards according to an embodiment.

With specific reference to FIG. 3 a method 46 of preventing RAW hazards is shown. Illustrated processing block 56 provides for determining whether the beginning of a draw call has been encountered. Thus, block 56 may involve determining whether the bit corresponding to the "Shared Resource Boundary" column of Table I is set (i.e., has a value of one) in the draw call command/instruction. If so, a determination may be made at block 58 as to whether the draw call has a coherency requirement relative to one or more previously encountered draw calls. Block 58 may therefore involve determining whether the "Shared Resource Coherency Requirement" bit is set in the draw call command/instruction. If so, block 60 provides for withholding the workload from the shader until a global counter of pending globally observed draw calls has reached zero.

As will be discussed in greater detail, the global counter may be used to track the progress of draw calls through downstream components of the graphics pipeline. Thus, the global counter reaching zero may indicate that the remainder of the pipeline contains no more draw calls. Such a condition may in turn indicate that the workload may be dispatched to the shader invocation without concern over RAW hazards. If either the beginning of the draw call is not being encountered or the draw call does not have a coherency requirement, block 60 is bypassed in the illustrated example.

Figure 4:
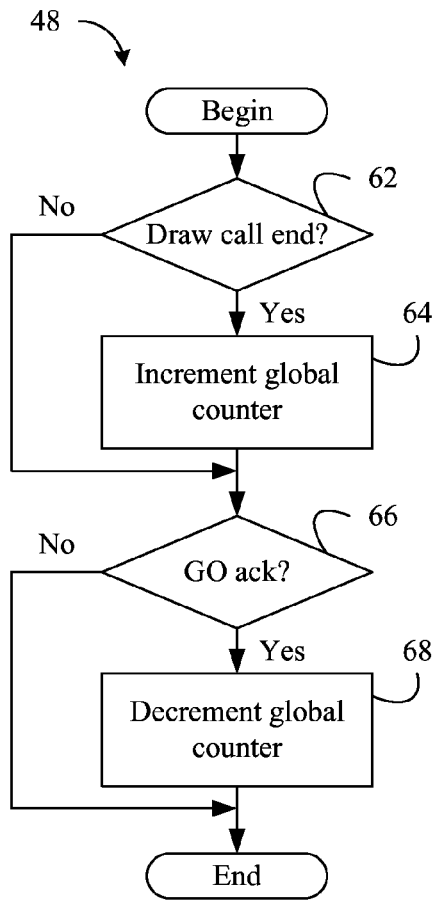
FIG. 4 is a flowchart of an example of a method of maintaining a global counter according to an embodiment.

With specific reference to FIG. 4, a method 48 of maintaining a global counter is shown, illustrated processing block 62 determines whether the end of a draw call has been reached. Block 56 may therefore involve determining whether the bit corresponding to the "Shared Resource Boundary" column of Table I is not set (i.e., has a value of zero) in the draw call command/instruction. If so, the global counter of pending globally observed ("GO") draw calls is incremented at illustrated block 64. Otherwise, block 64 may be bypassed. Block 66 may determine whether a globally observed acknowledgement has been received from a downstream component of the graphics pipeline. If so, block 68 may decrement the global counter. Otherwise, block 68 may be bypassed. Thus, the global counter value may fluctuate up and down as draw calls end and are acknowledged, respectively, with the global counter reaching zero when the number of ending draw calls equals the number of GO draw calls.

Figure 5:
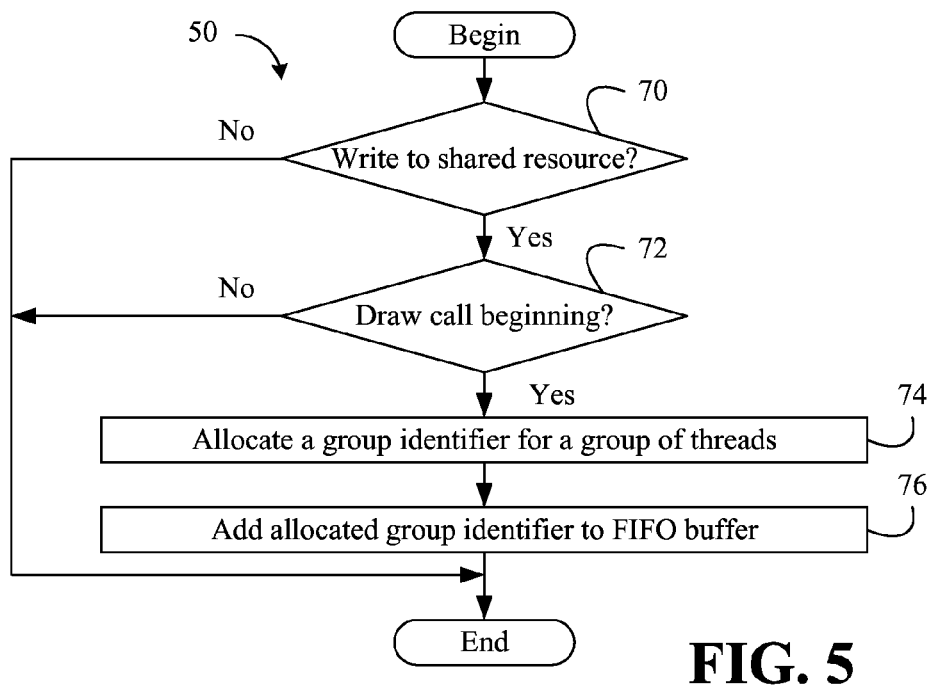
FIG. 5 is a flowchart of an example of a method of populating a first in first out (FIFO) buffer according to an embodiment.

With specific reference to FIG. 5, a method 50 of populating a FIFO buffer is shown. Illustrated processing block 70 determines whether the draw call writes to the shared resource. Block 70 may therefore include determining whether the bit corresponding to the "Shared Resource Marker" column of Table is set in the draw call command/instruction. If so, illustrated block 72 determines whether the beginning of the draw call has been encountered. If the beginning of the draw call has been encountered, a group identifier (ID, e.g., "color" ID) may be allocated for a group of threads at block 74, wherein illustrated block 76 adds the allocated group ID to a first in first out (FIFO) buffer. For example, if a group of sixteen threads use a draw call to operate on a 4×4 region of an image, that group of threads may be assigned a group ID, which may in turn be associated with the draw call. In one example, a 2-bit group ID is used and the FIFO buffer is four entries deep. Other ID and buffer configurations may also be used depending upon the circumstances. If either the draw call does not write to the shared resource or the beginning of the draw call has not been encountered, blocks 74 and 76 are bypassed in the illustrated example.

With specific reference to FIG. 52, a method 52 of maintaining thread counters is shown. Illustrated processing block 78 increments a thread counter, wherein the thread counter tracks each thread in a thread group associated with a draw call. Thus, if the thread group contains sixteen threads, for example, block 78 may increment the thread counter sixteen times. Block 80 may provide for dispatching the threads in the thread group to a shader invocation, wherein the thread counter may be decremented at block 82 in response to the retirement of each thread in the thread group.

With specific reference to FIG. 7, a method 54 of globally observing (e.g., at the system level) draw calls is shown. Illustrated processing block 84 determines whether the top entry in the FIFO buffer has group ID with a thread counter that is zero. If it is also determined at block 86 that the global counter is greater than zero, block 88 may post a GO notification. If either the thread counter corresponding to the top entry in the FIFO buffer is not zero or the global counter is not greater than zero, block 88 is bypassed in the illustrated example.

FIG. 8 shows a shader dispatch module 90 (90*a*, 90*b*) that may be readily substituted for any of the shader dispatch modules 26 (FIG. 1), already discussed. In the illustrated example, an interface 90*a* receives a plurality of signals from a software module associated with a shared resource. The plurality of signals may include, for example, a first signal that indicates whether a draw call accesses the shared resource, a second signal that indicates whether a boundary (e.g., beginning, ending) of the draw call has been reached, a third signal that indicates whether the draw call has a coherency requirement, and so forth.

The illustrated shader dispatch module 90 also includes a draw call manager 90*b* to selectively dispatch a workload corresponding to the draw call in a shader invocation based on the plurality of signals. In one example, the draw call manager 90*b* includes a global counter 92 of pending GO draw calls and a coherency unit 94 to withhold a workload from the shader invocation only if the first signal indicates that the draw call accesses the shared resource, the second signal indicates that a beginning of the draw call has been reached, and the third signal indicates that the draw call has a coherency requirement. In such a case, the workload may be withheld until the global counter 92 has reached zero. The illustrated global counter 92 includes an increment unit to increment the global counter 92 in response to the second signal indicating that an end of the draw call has been reached and a decrement unit to decrement the global counter 92 in response to an acknowledgement from a downstream component.

The draw call manager 90*b* may also include a group ID FIFO buffer 96 and an allocator 98 to allocate a group ID for a group of threads if the first signal indicates that the draw call writes to the shared resource and the second signal indicates that a beginning of the draw call has been reached. Additionally, a push unit 100 may add the allocated group ID to the FIFO buffer 96.

The illustrated draw call manager 90*b* also includes one or more thread counters 102, wherein each thread counter 102 has an increment unit to increment the thread counter 102 for each thread in a thread group associated with the draw call. A launch unit 104 may launch unit 104 may dispatch the threads in the thread group to a shader invocation. Additionally, each thread counter 102 may include a decrement unit to decrement the thread counter 102 in response to the retirement of each thread in the thread group.

The draw call manager 90*b* may also include a global observation unit 106 to post a GO notification in response to the top entry in the FIFO buffer 96 having a group ID with a thread counter that is zero and the global counter 92 being greater than zero. As already noted, the thread counter 102 may track each thread in a thread group associated with the draw call and the global counter 92 may track pending GO draw calls.

The pseudo code below provides one approach to implementing one or more aspects of the shader dispatch module 90.

```
Process_Draw( )
{
    If DrawBegin( ) {
        If DrawRequiresUAVCoherency( ) {
            Wait on (PendingGOCounter == 0);
        }
        If DrawOutputsUAV( ) {
            Wait on (AllocateGroupID( ) != NULL); // wait until
groupID is available
            CurrentGroupID = AllocateGroupID( );
            Push.GroupIDFIFO(CurrentGroupID);
        }
    }
    For all PS threads in the CurrentDraw { // i.e. in
    CurrentGroupID
        PendingFFTID[GroupID]++;
        LaunchPSThread[FFTID];
    }
    If DrawEnd( ) {
        PendingGOCounter++;
    }
}
Process DecrementFFTIDCounter(GroupID) { // PS thread retirement
invokes this process
        PendingFFTID[GroupID]--;
}
Process PostGONotification(GroupID){ //when top entry's
pendingFFTIDcounter becomes 0, this process is triggered
        If (PendingFFTID[GoupIDFIFO.TopEntry] == 0) AND
(PendingGOCounter > 0) {
            PostGONotification( );
        }
}
Process DecrementPendingGOCounter( ) //invoked by the receipt of
GO acknowledged from downstream
        PendingGOCounter--;
}
```

Figure 9:
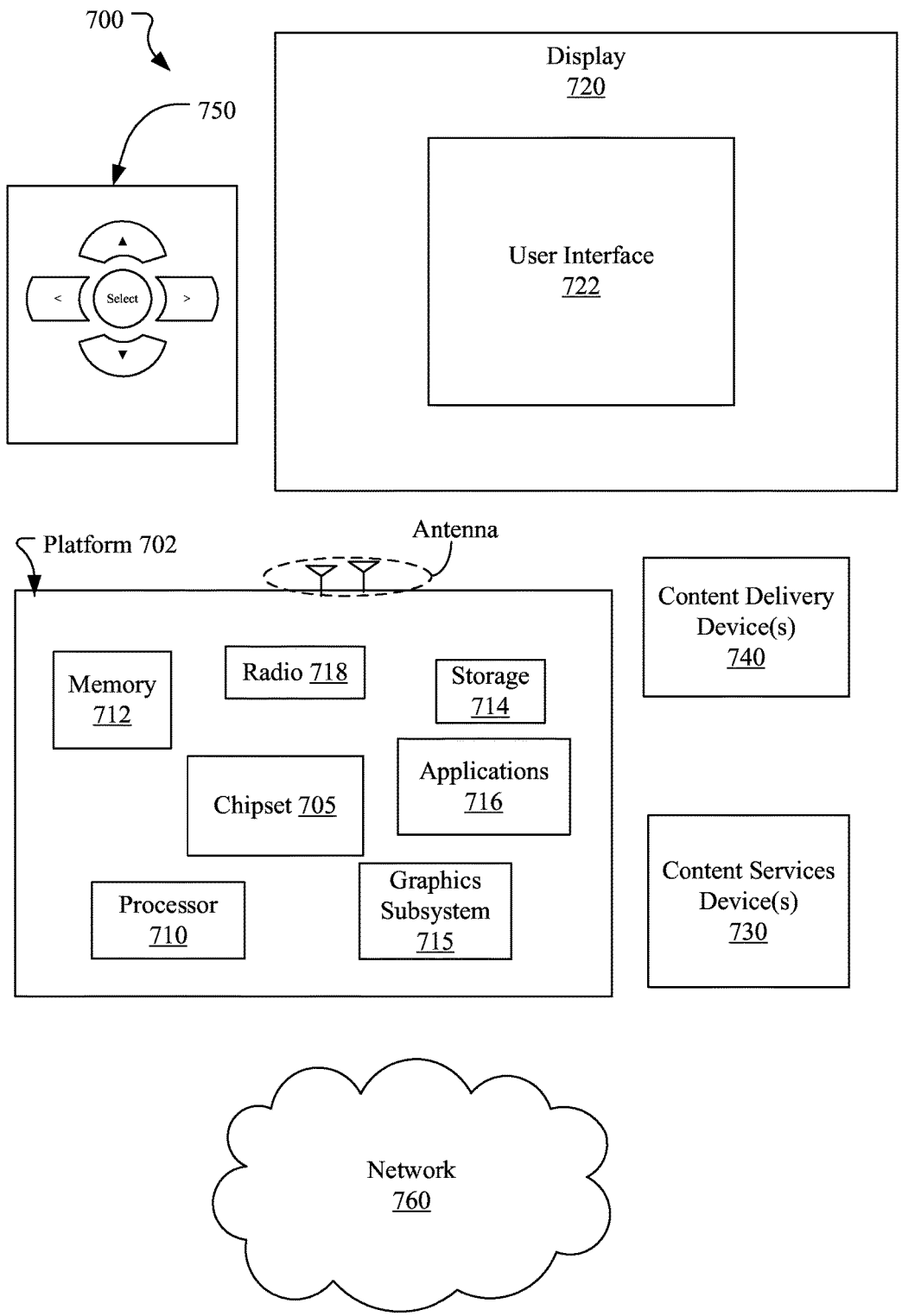
FIG. 9 is a block diagram of an example of a system according to an embodiment.

FIG. 9 illustrates an embodiment of a system 700 that may output visual content according to an embodiment. In embodiments, the system 700 may be a media system although system 700 is not limited to this context. For example, system 700 may be incorporated into a personal computer (PC), laptop computer, ultra-laptop computer, tablet computer, touch pad, portable computer, handheld computer, palmtop computer, personal digital assistant (PDA), cellular telephone, combination cellular telephone/

PDA, television, smart device (e.g., smart phone or smart television), mobile internet device (MID), messaging device, data communication device, gaming console, and so on.

In embodiments, the system 700 comprises a platform 702 coupled to a display 720. The platform 702 may receive content from a content device such as content services device(s) 730 or content delivery device(s) 740 or other similar content sources. A navigation controller 750 comprising one or more navigation features may be used to interact with, for example, the platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718. The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, the storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. The graphics subsystem 715 could be integrated into the processor 710 or chipset 705. The graphics subsystem 715 could be a stand-alone card communicatively coupled to chipset 705. In one example, the graphics subsystem 715 includes a pipeline such as, for example, the graphics pipeline 22 (FIG. 1), the processor 710 is a host processor that executes a software module such as, for example, the software module 32 (FIG. 1), and the memory 712 includes a shared resource such as, for example, the shared resource 30 (FIG. 1), already discussed.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, the radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display a user interface 722 on the display 720.

In embodiments, the content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to platform 702 and/or to display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and the platform 702 and/display 720, via the network 760 or directly. It will be appreciated that the content may be communicated unidirectionally and/or bidirectionally to and from any one of the components in the system 700 and a content provider via the network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from the navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display such as, for example, the display 720, by movements of a pointer, cursor, focus ring, or other visual indicators displayed on the display. For example, under the control of the software applications 716, the navigation features located on the navigation controller 750 may be mapped to virtual navigation features displayed on the user interface 722, for example. In embodiments, the controller 750 may not be a separate component but integrated into the platform 702 and/or display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, the chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and content services device(s) 730 may be integrated, or the platform 702 and content delivery device(s) 740 may be integrated, or the platform 702, content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, the system 700 may be implemented as a wireless system, a wired system, or a combination of both. When implemented as a wireless system, the system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, the system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
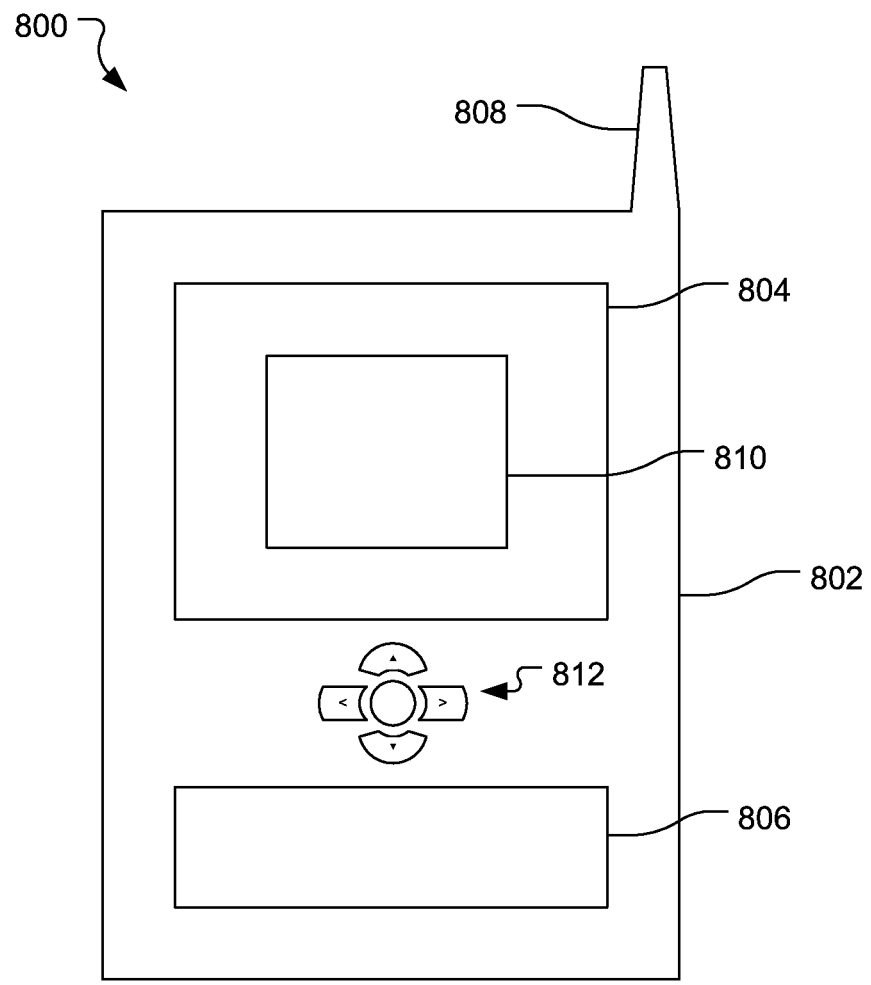
FIG. 10 is a block diagram of an example of a system having a small form factor according to an embodiment.

As described above, the system 700 may be embodied in varying physical styles or form factors. FIG. 10 illustrates embodiments of a small form factor device 800 in which the system 700 (FIG. 9) may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of a microphone. Such information may be digitized by a voice recognition device. The embodiments are not limited in this context.

Additional Notes and Examples

Example 1 may include a system comprising a radio to receive content, a shared resource, a host processor to execute a software module associated with the shared resource, and a shader dispatch module. The shader dispatch module may include an interface to receive a plurality of signals from the software module, wherein the plurality of signals are to include a first signal that indicates whether a draw call associated with the content accesses the shared resource, a second signal that indicates whether a boundary of the draw call has been reached, and a third signal that indicates whether the draw call has a coherency requirement. The shader dispatch module may also include a draw call manager to selectively dispatch a workload corresponding to the draw call in a shader invocation based on the plurality of signals. The system may also comprise a display to visually present the content.

Example 2 may include the system of Example 1, wherein the draw call manager includes a global counter of pending globally observed draw calls, and a coherency unit to withhold the workload from the shader invocation only if the first signal indicates that the draw call accesses the shared resource, the second signal indicates that a beginning of the draw call has been reached, and the third signal indicates that the draw call has a coherency requirement, wherein the workload is withheld until the global counter has reached zero.

Example 3 may include the system of Example 2, wherein the draw call manager further includes an increment unit to increment the global counter in response to the second signal indicating that an end of the draw call has been reached, and a decrement unit to decrement the global counter in response to an acknowledgement from a downstream graphics component.

Example 4 may include the system of Example 1, wherein the draw call manager includes a group identifier first in first out (FIFO) buffer, an allocator to allocate a group identifier for a group of threads if the first signal indicates that the draw call writes to the shared resource and the second signal indicates that a beginning of the draw call has been reached, and a push unit to add the group identifier to the FIFO buffer.

Example 5 may include the system of Example 1, wherein the draw call manager includes a thread counter, an increment unit to increment the thread counter for each thread in a thread group associated with the draw call, a launch unit to dispatch the threads in the thread group to the shader invocation, and a decrement unit to decrement the thread counter in response to a retirement of each thread in the thread group.

Example 6 may include the system of any one of Examples 1 to 5, wherein the draw call manager includes a group identifier first in first out (FIFO) buffer, and a global observation unit to post a globally observed notification in response to a top entry in the FIFO buffer having a group identifier with a thread counter that is zero and a global counter being greater than zero, wherein the thread counter is to track each thread in a thread group associated with the draw call and the global counter is to track pending globally observed draw calls.

Example 7 may include a method of operating a shader dispatch module, comprising receiving a plurality of signals from a software module associated with a shared resource, wherein the plurality of signals includes a first signal that indicates whether a draw call accesses the shared resource, a second signal that indicates whether a boundary of the draw call has been reached, and a third signal that indicates whether the draw call has a coherency requirement, and selectively dispatching a workload corresponding to the draw call in a shader invocation based on the plurality of signals.

Example 8 may include the method of Example 7, wherein selectively dispatching the workload includes withholding the workload from the shader invocation only if the first signal indicates that the draw call accesses the shared resource, the second signal indicates that a beginning of the draw call has been reached, and the third signal indicates that the draw call has a coherency requirement, wherein the workload is withheld until a global counter of pending globally observed draw calls has reached zero.

Example 9 may include the method of Example 8, further including incrementing the global counter in response to the second signal indicating that an end of the draw call has been reached, decrementing the global counter in response to an acknowledgement from a downstream graphics component.

Example 10 may include the method of Example 7, further including allocating a group identifier for a group of threads if the first signal indicates that the draw call writes to the shared resource and the second signal indicates that a beginning of the draw call has been reached, and adding the group identifier to a first in first out buffer.

Example 11 may include the method of Example 7, further including incrementing a thread counter of each thread in a thread group associated with the draw call, dispatching the threads in the thread group to the shader invocation, and decrementing the thread counter in response to a retirement of each thread in the thread group.

Example 12 may include the method of any one of Examples 7 to 11, further including posting a globally observed notification in response to a top entry in a first in first out buffer having a group identifier with a thread counter that is zero and a global counter being greater than zero, wherein the thread counter tracks each thread in a thread group associated with the draw call and the global counter tracks pending globally observed draw calls.

Example 13 may include at least one computer readable storage medium comprising a set of instructions which, when executed by a shader dispatch module of a computing device, cause the shader dispatch module to receive a plurality of signals from a software module associated with a shared resource, wherein the plurality of signals are to include a first signal that indicates whether a draw call accesses the shared resource, a second signal that indicates whether a boundary of the draw call has been reached, and a third signal that indicates whether the draw call has a coherency requirement, and selectively dispatch a workload corresponding to the draw call in a shader invocation based on the plurality of signals.

Example 14 may include the at least one computer readable storage medium of Example 13, wherein the instructions, when executed, cause the shader dispatch module to withhold the workload from the shader invocation only if the first signal indicates that the draw call accesses the shared resource, the second signal indicates that a beginning of the draw call has been reached, and the third signal indicates that the draw call has a coherency requirement, wherein the workload is withheld until a global counter of pending globally observed draw calls has reached zero.

Example 15 may include the at least one computer readable storage medium of Example 14, wherein the instructions, when executed, cause the shader dispatch module to increment the global counter in response to the second signal indicating that an end of the draw call has been reached, and decrement the global counter in response to an acknowledgement from a downstream graphics component.

Example 16 may include the at least one computer readable storage medium of Example 13, wherein the instructions, when executed, cause the shader dispatch module to allocate a group identifier for a group of threads if the first signal indicates that the draw call writes to the shared resource and the second signal indicates that a beginning of the draw call has been reached, add the group identifier to a first in first out buffer.

Example 17 may include the at least one computer readable storage medium of Example 13, wherein the instructions, when executed, cause the shader dispatch module to increment a thread counter of each thread in a thread group associated with the draw call, dispatch the threads in the thread group to the shader invocation, and decrement the thread counter in response to a retirement of each thread in the thread group.

Example 18 may include the at least one computer readable storage medium of any one of Examples 13 to 17, wherein the instructions, when executed, cause the shader dispatch module to post a globally observed notification in response to a top entry in a first in first out buffer having a group identifier with a thread counter that is zero and a global counter being greater than zero, wherein the thread counter is to track each thread in a thread group associated with the draw call and the global counter is to track pending globally observed draw calls.

Example 19 may include a shader dispatch module comprising an interface to receive a plurality of signals from a software module associated with a shared resource, wherein the plurality of signals are to include a first signal that indicates whether a draw call accesses the shared resource, a second signal that indicates whether a boundary of the draw call has been reached, and a third signal that indicates whether the draw call has a coherency requirement, and a draw call manager to selectively dispatch a workload corresponding to the draw call in a shader invocation based on the plurality of signals.

Example 20 may include the shader dispatch module of Example 19, wherein the draw call manager includes a global counter of pending globally observed draw calls, and a coherency unit to withhold the workload from the shader invocation only if the first signal indicates that the draw call accesses the shared resource, the second signal indicates that a beginning of the draw call has been reached, and the third signal indicates that the draw call has a coherency requirement, wherein the workload is withheld until the global counter has reached zero.

Example 21 may include the shader dispatch module of Example 20, wherein the draw call manager further includes an increment unit to increment the global counter in response to the second signal indicating that an end of the draw call has been reached, and a decrement unit to decrement the global counter in response to an acknowledgement from a downstream graphics component.

Example 22 may include the shader dispatch module of Example 19, wherein the draw call manager includes a group identifier first in first out (FIFO) buffer, an allocator to allocate a group identifier for a group of threads if the first signal indicates that the draw call writes to the shared resource and the second signal indicates that a beginning of the draw call has been reached, and a push unit to add the group identifier to the FIFO buffer.

Example 23 may include the shader dispatch module of Example 19, wherein the draw call manager includes a thread counter, an increment unit to increment the thread counter for each thread in a thread group associated with the draw call, a launch unit to dispatch the threads in the thread group to the shader invocation, and a decrement unit to decrement the thread counter in response to a retirement of each thread in the thread group.

Example 24 may include the shader dispatch module of any one of Examples 19 to 23, wherein the draw call manager includes a group identifier first in first out (FIFO) buffer, and a global observation unit to post a globally observed notification in response to a top entry in the FIFO buffer having a group identifier with a thread counter that is zero and a global counter being greater than zero, wherein the thread counter is to track each thread in a thread group associated with the draw call and the global counter is to track pending globally observed draw calls.

Example 25 may include a shader dispatch module comprising means for performing the method of any of Examples 7 to 12.

Techniques described herein may therefore avoid large gaps in graphics pipelines and fully pipeline draw call events up to the stage where coherency is required. Pixel shader dispatch (PSD) functions, for example, may maintain bookkeeping information to track multiple draw calls and enforce coherency in hardware at the pipeline level. Such an approach may be particularly useful for interactive applications that process a relatively large amount of draw calls on a real-time basis.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
    a radio to receive content;
    a shared resource;
    a host processor to execute a software module associated with the shared resource; and
    a shader dispatch module including,
        an interface to receive a plurality of signals from the software module, wherein the plurality of signals are to include a first signal that indicates whether a draw call associated with the content accesses the shared resource, a second signal that indicates whether a boundary of the draw call has been reached, and a third signal that indicates whether the draw call has a coherency requirement, and
        a draw call manager to selectively dispatch a workload corresponding to the draw call in a shader invocation based on the plurality of signals, wherein the selective dispatch includes issuing a first plurality of signals with a first draw call and a second plurality of signals with a second draw call, and the first plurality of signals and the second plurality of signals enable an internal tracking of the first draw call and the second draw call at a pipeline level of a graphics pipeline, wherein the graphics pipeline is to include a series of stages having a plurality of shader invocations, and wherein the second draw call is to progress through one or more stages of the graphics pipeline independent of an entirety of the graphics pipeline being flushed; and
    a display to visually present the content.

2. The system of claim 1, wherein the draw call manager includes:
    a global counter of pending globally observed draw calls; and
    a coherency unit to withhold the workload from the shader invocation only if the first signal indicates that the draw call accesses the shared resource, the second signal indicates that a beginning of the draw call has been reached, and the third signal indicates that the draw call has a coherency requirement, wherein the workload is withheld until the global counter has reached zero.

3. The system of claim 2, wherein the draw call manager further includes:

an increment unit to increment the global counter in response to the second signal indicating that an end of the draw call has been reached; and a decrement unit to decrement the global counter in response to an acknowledgement from a downstream graphics component.

4. The system of claim 1, wherein the draw call manager includes:

a group identifier first in first out (FIFO) buffer;

an allocator to allocate a group identifier for a group of threads if the first signal indicates that the draw call writes to the shared resource and the second signal indicates that a beginning of the draw call has been reached; and a push unit to add the group identifier to the FIFO buffer.

5. The system of claim 1, wherein the draw call manager includes:

a thread counter;

an increment unit to increment the thread counter for each thread in a thread group associated with the draw call;

a launch unit to dispatch the threads in the thread group to the shader invocation; and a decrement unit to decrement the thread counter in response to a retirement of each thread in the thread group.

6. The system of claim 1, wherein the draw call manager includes:

a group identifier first in first out (FIFO) buffer; and a global observation unit to post a globally observed notification in response to a top entry in the FIFO buffer having a group identifier with a thread counter that is zero and a global counter being greater than zero, wherein the thread counter is to track each thread in a thread group associated with the draw call and the global counter is to track pending globally observed draw calls.

7. A method of operating a shader dispatch module, comprising:

receiving a plurality of signals from a software module associated with a shared resource, wherein the plurality of signals includes a first signal that indicates whether a draw call accesses the shared resource, a second signal that indicates whether a boundary of the draw call has been reached, and a third signal that indicates whether the draw call has a coherency requirement; and selectively dispatching a workload corresponding to the draw call in a shader invocation based on the plurality of signals, wherein the selective dispatch includes issuing a first plurality of signals with a first draw call and a second plurality of signals with a second draw call, and the first plurality of signals and the second plurality of signals enable an internal tracking of the first draw call and the second draw call at a pipeline level of a graphics pipeline, wherein the graphics pipeline includes a series of stages having a plurality of shader invocations, and wherein the second draw call progresses through one or more stages of the graphics pipeline independent of an entirety of the graphics pipeline being flushed.

8. The method of claim 7, wherein selectively dispatching the workload includes:

withholding the workload from the shader invocation only if the first signal indicates that the draw call accesses the shared resource, the second signal indicates that a beginning of the draw call has been reached, and the third signal indicates that the draw call has a coherency requirement, wherein the workload is withheld until a global counter of pending globally observed draw calls has reached zero.

9. The method of claim 8, further including:

incrementing the global counter in response to the second signal indicating that an end of the draw call has been reached; and decrementing the global counter in response to an acknowledgement from a downstream graphics component.

10. The method of claim 7, further including:

allocating a group identifier for a group of threads if the first signal indicates that the draw call writes to the shared resource and the second signal indicates that a beginning of the draw call has been reached; and adding the group identifier to a first in first out buffer.

11. The method of claim 7, further including:

incrementing a thread counter of each thread in a thread group associated with the draw call;

dispatching the threads in the thread group to the shader invocation; and decrementing the thread counter in response to a retirement of each thread in the thread group.

12. The method of claim 7, further including:

posting a globally observed notification in response to a top entry in a first in first out buffer having a group identifier with a thread counter that is zero and a global counter being greater than zero, wherein the thread counter tracks each thread in a thread group associated with the draw call and the global counter tracks pending globally observed draw calls.

13. At least one non-transitory computer readable storage medium comprising a set of instructions which, when executed by a shader dispatch module of a computing device, cause the shader dispatch module to:

receive a plurality of signals from a software module associated with a shared resource, wherein the plurality of signals are to include a first signal that indicates whether a draw call accesses the shared resource, a second signal that indicates whether a boundary of the draw call has been reached, and a third signal that indicates whether the draw call has a coherency requirement; and selectively dispatch a workload corresponding to the draw call in a shader invocation based on the plurality of signals, wherein the selective dispatch includes issuing a first plurality of signals with a first draw call and a second plurality of signals with a second draw call, and the first plurality of signals and the second plurality of signals enable an internal tracking of the first draw call and the second draw call at a pipeline level of a graphics pipeline, wherein the graphics pipeline is to include a series of stages having a plurality of shader invocations, and wherein the second draw call is to progress through one or more stages of the graphics pipeline independent of an entirety of the graphics pipeline being flushed.

14. The at least one non-transitory computer readable storage medium of claim 13, wherein the instructions, when executed, cause the shader dispatch module to:

withhold the workload from the shader invocation only if the first signal indicates that the draw call accesses the shared resource, the second signal indicates that a beginning of the draw call has been reached, and the third signal indicates that the draw call has a coherency requirement, wherein the workload is withheld until a global counter of pending globally observed draw calls has reached zero.

15. The at least one non-transitory computer readable storage medium of claim 14, wherein the instructions, when executed, cause the shader dispatch module to:
   increment the global counter in response to the second signal indicating that an end of the draw call has been reached; and
   decrement the global counter in response to an acknowledgement from a downstream graphics component.

16. The at least one non-transitory computer readable storage medium of claim 13, wherein the instructions, when executed, cause the shader dispatch module to:
   allocate a group identifier for a group of threads if the first signal indicates that the draw call writes to the shared resource and the second signal indicates that a beginning of the draw call has been reached;
   add the group identifier to a first in first out buffer.

17. The at least one non-transitory computer readable storage medium of claim 13, wherein the instructions, when executed, cause the shader dispatch module to:
   increment a thread counter of each thread in a thread group associated with the draw call;
   dispatch the threads in the thread group to the shader invocation; and
   decrement the thread counter in response to a retirement of each thread in the thread group.

18. The at least one non-transitory computer readable storage medium of claim 13, wherein the instructions, when executed, cause the shader dispatch module to:
   post a globally observed notification in response to a top entry in a first in first out buffer having a group identifier with a thread counter that is zero and a global counter being greater than zero, wherein the thread counter is to track each thread in a thread group associated with the draw call and the global counter is to track pending globally observed draw calls.

19. A shader dispatch module comprising:
   an interface to receive a plurality of signals from a software module associated with a shared resource, wherein the plurality of signals are to include a first signal that indicates whether a draw call accesses the shared resource, a second signal that indicates whether a boundary of the draw call has been reached, and a third signal that indicates whether the draw call has a coherency requirement; and
   a draw call manager to selectively dispatch a workload corresponding to the draw call in a shader invocation based on the plurality of signals, wherein the selective dispatch includes issuing a first plurality of signals with a first draw call and a second plurality of signals with a second draw call, and the first plurality of signals and the second plurality of signals enable an internal tracking of the first draw call and the second draw call at a pipeline level of a graphics pipeline, wherein the graphics pipeline is to include a series of stages having a plurality of shader invocations, and wherein the second draw call is to progress through one or more stages of the graphics pipeline independent of an entirety of the graphics pipeline being flushed.

20. The shader dispatch module of claim 19, wherein the draw call manager includes:
   a global counter of pending globally observed draw calls; and
   a coherency unit to withhold the workload from the shader invocation only if the first signal indicates that the draw call accesses the shared resource, the second signal indicates that a beginning of the draw call has been reached, and the third signal indicates that the draw call has a coherency requirement, wherein the workload is withheld until the global counter has reached zero.

21. The shader dispatch module of claim 20, wherein the draw call manager further includes:
   an increment unit to increment the global counter in response to the second signal indicating that an end of the draw call has been reached; and
   a decrement unit to decrement the global counter in response to an acknowledgement from a downstream graphics component.

22. The shader dispatch module of claim 19, wherein the draw call manager includes:
   a group identifier first in first out (FIFO) buffer;
   an allocator to allocate a group identifier for a group of threads if the first signal indicates that the draw call writes to the shared resource and the second signal indicates that a beginning of the draw call has been reached; and
   a push unit to add the group identifier to the FIFO buffer.

23. The shader dispatch module of claim 19, wherein the draw call manager includes:
   a thread counter;
   an increment unit to increment the thread counter for each thread in a thread group associated with the draw call;
   a launch unit to dispatch the threads in the thread group to the shader invocation; and
   a decrement unit to decrement the thread counter in response to a retirement of each thread in the thread group.

24. The shader dispatch module of claim 19, wherein the draw call manager includes:
   a group identifier first in first out (FIFO) buffer; and
   a global observation unit to post a globally observed notification in response to a top entry in the FIFO buffer having a group identifier with a thread counter that is zero and a global counter being greater than zero, wherein the thread counter is to track each thread in a thread group associated with the draw call and the global counter is to track pending globally observed draw calls.

* * * * *